Dec. 22, 1953  J. Y. TAYLOR  2,663,220
INDICATING OPTICAL IMAGE PROJECTION
APPARATUS FOR PROJECTORS
Filed Aug. 24, 1951  3 Sheets-Sheet 1

INVENTOR
JAMES Y. TAYLOR
BY
Raymond A. Paquin
ATTORNEY

Dec. 22, 1953

J. Y. TAYLOR 2,663,220

INDICATING OPTICAL IMAGE PROJECTION
APPARATUS FOR PROJECTORS

Filed Aug. 24, 1951

INVENTOR
JAMES Y. TAYLOR
BY
Raymond A. Paquin
ATTORNEY

Dec. 22, 1953   J. Y. TAYLOR   2,663,220
INDICATING OPTICAL IMAGE PROJECTION
APPARATUS FOR PROJECTORS
Filed Aug. 24, 1951   3 Sheets-Sheet 3

INVENTOR
JAMES Y. TAYLOR,
BY
Raymond A. Paquin
ATTORNEY.

Patented Dec. 22, 1953

2,663,220

UNITED STATES PATENT OFFICE 2,663,220

INDICATING OPTICAL IMAGE PROJECTION APPARATUS FOR PROJECTORS

James Y. Taylor, Garland, Tex.

Application August 24, 1951, Serial No. 243,543

10 Claims. (Cl. 88—24)

This invention relates to projection apparatus and has particular reference to a new and improved apparatus of the type employed for the projection of opaque material upon a screen.

An object of the invention is to provide a new and improved apparatus for projecting an optical pointer comprising a visible light spot on the projected image on the screen, which spot may be moved over the projected image whereby the operator may point out any particular feature or detail of the projected image or copy.

Another object is to provide a device of the type set forth which is mounted entirely exteriorly of the projector casing or housing thereby allowing its optional application to new projectors and also its application to projectors previously in use.

Another object is to provide such a device which is a complete unit in itself apart from the opaque projector.

Another object is to provide a device of the type set forth which may employ a condensed filament lamp thus providing an improved pointer.

Another object is to provide such a device having relatively few reflector and optical surfaces whereby any loss of light is reduced to a minimum.

Another object is to provide such a device which is relatively simple in construction yet efficient in operation.

Another object is to provide such a device which is optically disassociated and separate from the optical system of the opaque projector.

Other objects and advantages of the invention will be apparent from the following description taken in connection with the accompanying drawings. It will be understood that changes may be made in the details of construction and arrangement of parts without departing from the scope of the invention as expressed in the accompanying claims.

Referring to the drawings.

Figure 1:
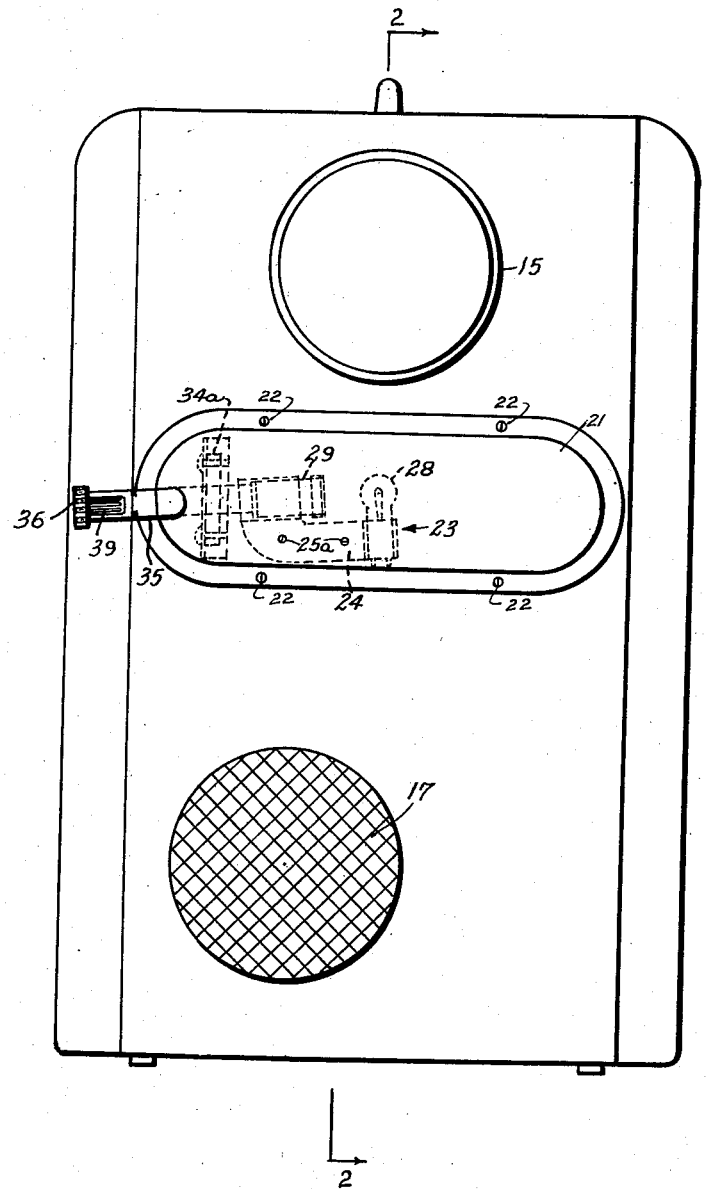
Fig. 1 is a front view of a projection apparatus having the pointer of the invention in operative position thereon.
Figure 2:
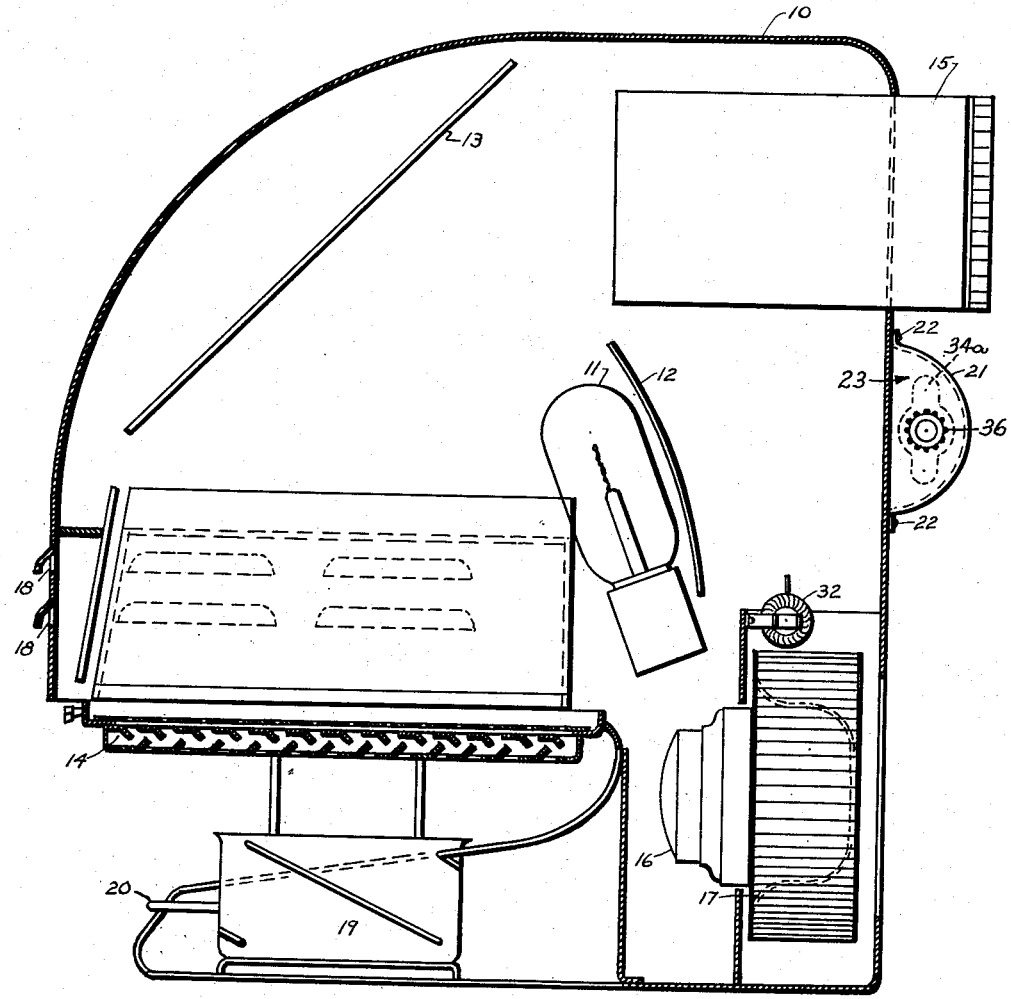
Fig. 2 is a sectional view taken on line 2—2 of Fig. 1, looking in the direction of the arrows.
Figure 3:
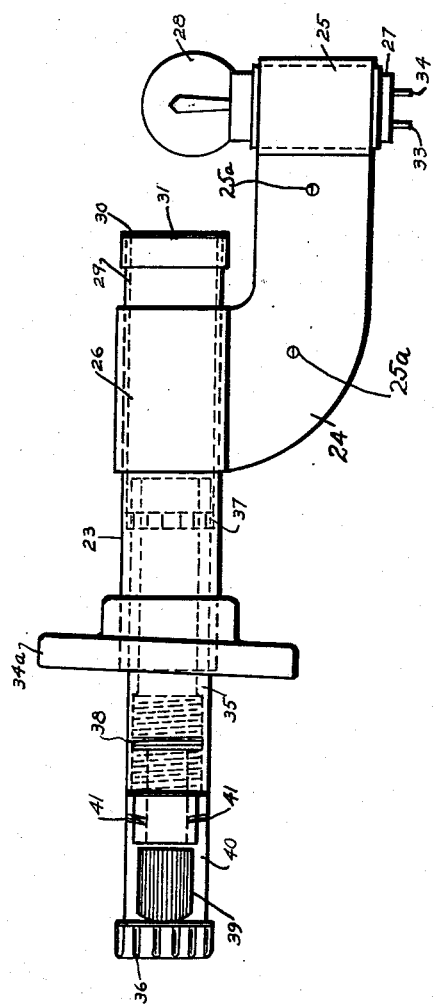
Fig. 3 is a front view of the pointer apparatus per se.

Referring more particularly to the drawings wherein similar reference characters designate corresponding parts throughout the several views, the opaque projection apparatus with which the invention is employed comprises, a housing 10 having the lamp 11, reflector 12 behind lamp 11 and reflector 13 adapted to reflect an image of copy on platen 14 through objective lens system 15 on to a projection screen.

A motor 16 and blower 17 is provided for ventilating the interior of housing 10 and exhaust ventilation openings 18 are provided for allowing the exhaust from the housing of air blown over the copy by blower 17.

The platen 14 shown comprises a tray carried on spiral lift arrangement 19 adapted to be operated by handle 20.

Exteriorly of casing or housing 10 is provided a dust and light shield 21 adapted to be secured on the front wall of casing 10 by means of screws or bolts 22 whereby said shield may be easily and quickly attached to a projector if desired.

Within shield 21 is positioned the optical pointer 23 which is supported on bracket 24, as hereinafter described, and which is secured to the wall of casing 10 by bolts or screws 25—a thus providing a construction which may be optionally applied to finished projectors and to projectors previously in use.

Bracket 24 has the tubular end portions 25 and 26 at substantially right angles to each other with end portion 25 adapted to contain socket 27 for lamp 28 and mounted in end portion 26 is tubular member 29 having an end cap 30 having an aperture 31 therein of desired configuration.

This aperture is of the outline to be projected on the image of the projected copy on the screen and therefore this aperture can be merely a round aperture or have the shape of an arrow or other desired configuration.

The tube 29 may be adjusted to place aperture 31 in suitable optical relation with lamp 28, which lamp may be of lower voltage type, for example, by using resistor 32, which for convenience may be positioned within housing 10, a 12–16 volt lamp will work satisfactorily. This allows the use of lamps having condensed filaments. Resistor 32 is connected to lead 33 from lamp 28 and lead 34 is connected to a 110 volt A. C. line. If desired a full 110 volt lamp may be employed without a resistor.

Support 34a is secured to shield 21 or the wall of housing 10 and supports the end of tube 29 and tube 35 is in telescoping relation with tube 29 and adapted to be moved in and out of tube 29 by the operator by holding handle portion 36 and friction spring 37 is adapted to retain tube 35 in adjusted position relative to tube 29.

Within tube 35 is lens 38 and adjacent the end of tube 35 is provided reflector 39 in adjustable member 40 which is pivotally mounted at 41 on tube 35 for pivotal movement in a horizontal plane.

By grasping handle 36, mirror 39 and tube 35 may be pivoted or rotated to vary the vertical position of the projected spot or pointer on the screen.

In operation, the operator may adjust tube 35 longitudinally and rotate it to position the projected pointer at the desired point on the copy projected by the opaque projector and by these horizontal and vertical adjustments may point out any desired point on the screen.

If a lamp 28 is employed with a lens built therein, it may be possible to eliminate lens 38.

From the foregoing it will be seen that I have provided simple, efficient and economical means for obtaining all of the objects and advantages of the invention.

I claim:

1. In a device of the character described for projecting an indicating optical image on a projected image on a screen, a support adapted to be secured on a projector, a source of illumination carried by said support, a first tubular member on said support and optically aligned with said source of illumination and having an aperture of the configuration of which an image is to be projected to form said indicating image, a second tubular member in telescoping relation with said first tubular member, said second tubular member having a handle portion adjacent its free end, said second tubular member being rotatable relative to said first tubular member and a pivotally mounted reflector carried by said second tubular member adjacent its free end and in optical alignment with said source of illumination whereby said reflector may be moved longitudinally and rotated to project said image of said aperture to any desired point on a screen.

2. In a device of the character described for projecting an indicating optical image on a projected image on a screen, a support adapted to be secured on a projector, a source of illumination carried by said support, a first tubular member on said support and optically aligned with said source of illumination and having an aperture of the configuration of which an image is to be projected to form said indicating image, a second tubular member in telescoping relation with said first tubular member, said second tubular member having a handle portion adjacent its free end, said second tubular member being rotatable relative to said first tubular member and a pivotally mounted reflector carried by said second tubular member adjacent its free end and in optical alignment with said source of illumination whereby said reflector may be moved longitudinally and rotated to project said image of said aperture to any desired point on a screen, and means for retaining said tubular members in adjusted relative position.

3. In a device of the character described for projecting an indicating optical image on a projected image on a screen, a support adapted to be secured on a projector and having a pair of tubular portions substantially normal to each other, a source of illumination carried by one of said tubular portions on said support, a first tubular member on the other of said tubular portions on said support and having an aperture of the configuration of which an image is to be projected to form said indicating image, a second tubular member in telescoping relation with said first tubular member, said second tubular member having a handle portion adjacent its free end, said second tubular member being rotatable relative to said first tubular member and a pivotally mounted reflector carried by said second tubular member adjacent its free end and in optical alignment with said source of illumination whereby said reflector may be moved longitudinally and rotated to project said image of said aperture to any desired point on a screen.

4. In a device of the character described for projecting an indicating optical image on a projected image on a screen, a support adapted to be secured on a projector and having a pair of tubular portions substantially normal to each other, a source of illumination carried by one of said tubular portions on said support, a first tubular member on the other of said tubular portions on said support and optically aligned with said source of illumination and having an aperture of the configuration of which an image is to be projected, a second tubular member in telescoping relation with said first tubular member, said second tubular member having a handle portion adjacent its free end, said second tubular member being rotatable relative to said first tubular member and a pivotally mounted reflector carried by said second tubular member adjacent its free end and in optical alignment with said source of illumination whereby said reflector may be moved longitudinally and rotated to project said image of said aperture to any desired point on a screen, and means for retaining said tubular members in adjusted relative position.

5. In a device of the character described for projecting an indicating optical image on a projected image on a screen, a support adapted to be secured on a projector, a source of illumination on said support, a first tubular member on said support and optically aligned with said source of illumination and having an aperture of the configuration of which an image is to be projected, a second tubular member in telescoping relation with said first tubular member, said second tubular member having a handle portion adjacent its free end, said second tubular member being rotatable relative to said first tubular member and a pivotally mounted reflector carried by said second tubular member adjacent its free end and in optical alignment with said source of illumination whereby said reflector may be moved longitudinally and rotated to project said image of said aperture to any desired point on a screen and a shield over said device and secured to said projector and having an opening through which extends said second tubular member.

6. In a device of the character described for projecting an indicating optical image on a projected image on a screen, a support adapted to be secured on a projector, a source of illumination on said support, a first tubular member on said support and optically aligned with said source of illumination and having an aperture of the configuration of which an image is to be projected, a second tubular member in telescoping relation with said first tubular member, said second tubular member having a handle portion adjacent its free end, said second tubular member being rotatable relative to said first tubular member and a pivotally mounted reflector carried by said second tubular member adjacent its free end and in optical alignment with said source of illumination whereby said reflector may be moved longitudinally and rotated to project said image of said aperture to any desired point on a screen, and means for retaining said tubular members in adjusted relative position and a shield over said device and secured to said projector and having an opening through which extends said second tubular member.

7. In a device of the character described for projecting an indicating optical image on a projected image on a screen, a support adapted to be secured on the exterior of an opaque projection apparatus, a light source carried by said support, a pair of telescoping members, one of said telescoping members having an aperture to form said indicating image, the image of which is to be projected on the image of the copy projected by said opaque projection apparatus, said telescoping members being longitudinally adjustable relative to each other, one of said telescoping members being rotatable relative to the other thereof and having a pivotable reflector and a handle portion for pivotal and longitudinal adjustment of said tubular members.

8. In a device of the character described for projecting an indicating optical image on a projected image on a screen, a support adapted to be secured on the exterior of an opaque projection apparatus, a light source carried by said support, a pair of telescoping members, one of said telescoping members having an aperture to form said indicating image, the image of which is to be projected on the image of the copy projected by said opaque projection apparatus, said telescoping members being longitudinally adjustable relative to each other, one of said telescoping members being rotatable relative to the other thereof and having a pivotable reflector and a handle portion for pivotal and longitudinal adjustment of said tubular members, and means for retaining said tubular members in adjusted relative position.

9. In a device of the character described for projecting an indicating optical image on a projected image on a screen, a support adapted to be secured on the exterior of an opaque projection apparatus, a light source carried by said support, a pair of telescoping members, one of said telescoping members having an aperture to form said indicating image, the image of which is to be projected on the image of the copy projected by said opaque projection apparatus, said telescoping members being longitudinally adjustable relative to each other, one of said telescoping members being rotatable relative to the other thereof and having a pivotable reflector and a handle portion for pivotal and longitudinal adjustment of said tubular members and a shield over said device and secured to said projector and having an opening through which extends said second tubular member.

10. In a device of the character described for projecting an indicating optical image on a projected image on a screen, a support adapted to be secured on the exterior of an opaque projection apparatus, a light source carried by said support, a pair of telescoping members, one of said telescoping members having an aperture, the image of which is to be projected on the image of the copy projected by the opaque projector, said telescoping members being longitudinally adjustable relative to each other, one of said telescoping members being rotatable relative to the other thereof and having a pivotable reflector aligned with said light source of illumination and a handle portion for pivotal and longitudinal adjustment of said tubular members, and means for retaining said tubular members in adjusted relative position and a shield over said device and secured to the projector and having an opening through which extends said second tubular member.

JAMES Y. TAYLOR.

References Cited in the file of this patent

UNITED STATES PATENTS

| Number | Name | Date |
| --- | --- | --- |
| 1,332,999 | Smith | Mar. 9, 1920 |
| 1,346,359 | Wenderhold | July 13, 1920 |
| 1,704,811 | Stuber | Mar. 12, 1929 |
| 2,332,691 | Blaisdell | Oct. 26, 1943 |
| 2,357,542 | Pfeil | Sept. 5, 1944 |
| 2,395,561 | Osterberg et al. | Feb. 26, 1946 |
| 2,463,026 | Field | Mar. 1, 1949 |
| 2,555,402 | Field | June 5, 1951 |
| 2,578,106 | Taylor | Dec. 11, 1951 |